US009732859B2

(12) United States Patent
Eilers et al.

(10) Patent No.: US 9,732,859 B2
(45) Date of Patent: Aug. 15, 2017

(54) NOISE REDUCING DIFFUSER TRIM

(71) Applicant: FISHER CONTROLS INTERNATIONAL LLC, Marshalltown, IA (US)

(72) Inventors: Daniel J. Eilers, Marshalltown, IA (US); Allen C. Fagerlund, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/919,834

(22) Filed: Oct. 22, 2015

(65) Prior Publication Data

US 2016/0123477 A1 May 5, 2016

Related U.S. Application Data

(60) Provisional application No. 62/073,755, filed on Oct. 31, 2014.

(51) Int. Cl.
F16K 1/54 (2006.01)
F16K 47/14 (2006.01)
F16K 1/34 (2006.01)
F16K 1/52 (2006.01)
F16K 27/02 (2006.01)
(Continued)

(52) U.S. Cl.
CPC ............... F16K 1/54 (2013.01); F16K 1/34 (2013.01); F16K 1/52 (2013.01); F16K 27/02 (2013.01); F16K 47/023 (2013.01); F16K 47/08 (2013.01); F16K 47/14 (2013.01)

(58) Field of Classification Search
CPC ..... F16K 1/32; F16K 1/34; F16K 1/52; F16K 1/54; F16K 27/02; F16K 47/02; F16K 47/023; F16K 47/026; F16K 47/08; F16K 47/14; Y10T 137/86718; Y10T 137/86791;
(Continued)

(56) References Cited

U.S. PATENT DOCUMENTS 4,149,563 A 4/1979 Seger
4,384,592 A 5/1983 Ng
(Continued)

FOREIGN PATENT DOCUMENTS

DE    EP 0063627 A1 * 11/1982 .......... F16K 11/0746

OTHER PUBLICATIONS

Search Report for International application No. PCT/US2015/058181, mailed Jan. 29, 2016.
(Continued)

Primary Examiner — Mary McManmon
Assistant Examiner — Richard K Durden
(74) Attorney, Agent, or Firm — Marshall, Gerstein & Borun LLP

(57) ABSTRACT

A fluid valve includes a valve body having a fluid inlet and a fluid outlet connected by a fluid passageway. A valve seat is disposed within the fluid passageway. A fluid control member is movably disposed within the fluid passageway, the fluid control member cooperating with a trim assembly to control fluid flow through the fluid passageway. The trim assembly includes a cage having a plurality of openings that characterize fluid flowing through the cage and a plurality of vents that suppress noise generated by the plurality of openings.

18 Claims, 4 Drawing Sheets

(51) Int. Cl.
*F16K 47/02* (2006.01)
*F16K 47/08* (2006.01)

(58) Field of Classification Search
CPC ..... Y10T 137/86799; Y10T 137/86807; Y10T 137/87265; Y10T 137/87539
USPC ............ 137/599.01, 601.18, 625.28, 625.37, 137/625.38, 625.39
See application file for complete search history.

(56) References Cited

U.S. PATENT DOCUMENTS

| | | | |
|---|---|---|---|
| 6,637,452 B1* | 10/2003 | Alman | F16K 3/243 137/244 |
| 6,766,826 B2* | 7/2004 | Baumann | F16K 47/08 137/625.3 |
| 6,973,941 B2* | 12/2005 | Baumann | F16K 3/267 137/625.37 |
| 2006/0096650 A1* | 5/2006 | Sawchuk | F15D 1/001 138/39 |
| 2016/0208932 A1* | 7/2016 | Rickis | F16K 47/14 |

OTHER PUBLICATIONS

Written Opinion for International application No. PCT/US2015/058181, mailed Jan. 29, 2016.
International Preliminary Report on Patentability for International application No. PCT/US2015/058181, dated May 2, 2017.

\* cited by examiner

NOISE REDUCING DIFFUSER TRIM

BACKGROUND

Field of the Disclosure

The invention generally relates to control valves including a trim assembly having a plurality of pressure reducing openings and more specifically to a control valve trim having a first plurality of pressure reducing openings and a second plurality of noise reducing vents.

Related Technology

Fluid valves control the flow of fluid from one location to another. When the fluid valve is in a closed position, high pressure fluid on one side is prevented from flowing to a lower pressure location on the other side of the valve. Often fluid valves contain a movable fluid control member and a seat of some sort that cooperates with the fluid control member to control fluid flow through the valve. In some cases it may be desirable to characterize fluid as it flows through the valve, for example, to reduce pressure. In these cases, a trim assembly may be used that includes a cage with a plurality of pressure reducing openings. The openings may be sized and shaped to characterize fluid flow through the trim assembly, for example by reducing fluid pressure. However, the pressure reducing openings create turbulent flow downstream of the valve trim, which results in unwanted noise.

Turning now to FIG. 1, a known control valve 10 is illustrated. The control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22 and a seat 24. A fluid control member, such as a plug 26 is disposed within the cage 22 and the plug 26 interacts with the seat 24 to control fluid flow through the valve body 12. A stem 28 is connected to the plug 26 at one end and an actuator 30 at another end. The actuator 30 controls movement of the plug 26 within the cage 22.

As illustrated in FIG. 2, the cage 22 includes a first end 32 and a second end 36. A cage wall 38 extends between the first end 32 and the second end 36, the cage wall 38 forming a hollow central bore within which the valve plug 26 slides to control fluid flow through the cage 22. A plurality of cage openings 40 is formed in the cage wall 38. The plurality of cage openings 40 characterize fluid flowing through the cage 22, by for example, reducing the pressure of the fluid as it flows through the openings 40. The openings may be generally circular in shape with a central axis A that is perpendicular to a longitudinal axis B of the cage 22.

SUMMARY OF THE DISCLOSURE

In one aspect, a fluid valve comprises a valve body having a fluid inlet and a fluid outlet connected by a fluid passageway; a trim assembly disposed within the fluid passageway, the trim assembly having a cage and a seat; a fluid control member movably disposed within the fluid passageway, the fluid control member cooperating with the trim assembly to control fluid flow through the fluid passageway; a plurality of openings disposed in a wall of the cage, the plurality of openings characterizing fluid flow through the trim assembly; and a plurality of vents disposed around each opening in the plurality of openings, the plurality of vents directing fluid flow towards fluid flowing out of the plurality of openings to suppress noise generated by the fluid flowing out of the plurality of openings.

In another aspect, a cage for a trim assembly of a control valve comprises a cage wall extending from a first end to a second end, the cage wall forming a hollow circular cylinder; a plurality of openings disposed in the cage wall, the plurality of openings characterizing fluid flow through the cage; and a plurality of vents disposed around each opening in the plurality of openings, the plurality of vents directing fluid flow towards fluid flowing out of the plurality of openings to suppress noise generated by the fluid flowing out of the plurality of openings, each opening in the plurality of openings including a central axis that is substantially perpendicular to a longitudinal axis of the cage, and each vent in the plurality of vents including a central axis that is angled, non-parallel and non-perpendicular, relative to the longitudinal axis of the cage, the central axis of the openings being angled relative to the central axis of the vents in the range of between 10 degrees and 80 degrees.

In further accordance with any one or more of the foregoing first and second aspects, a control valve or a cage as outlined above may further include any one or more of the following preferred forms.

In some preferred forms, at least one opening in the plurality of openings includes a central axis that is substantially perpendicular to a longitudinal axis of the cage, and at least one vent in the plurality of vents includes a central axis that is angled, non-parallel and non-perpendicular, relative to the longitudinal axis of the cage.

In other preferred forms, the central axis of the at least one opening and the central axis of at least one vent are angled, non-parallel and non-perpendicular, relative to one another, the angle being between 10 degrees and 80 degrees, preferably between 20 degrees and 70 degrees, and more preferably between 30 degrees and 60 degrees.

In other preferred forms, the plurality of vents includes between two and twelve vents, and preferably between six and eight vents.

In yet other preferred forms, at least one vent in the plurality of vents includes side walls that are parallel to one another, thereby forming a circular bore.

In yet other preferred forms, at least one vent in the plurality of vents includes side walls that angle inwardly relative to one another, in some forms the side walls angle from an inner surface of the cage to an outer surface of the cage, in other forms the side walls begin angling towards one another at an intermediate point between the inner surface of the cage and the outer surface of the cage, and in some forms the at least one vent forms a nozzle.

In yet other preferred forms, at least one vent in the plurality of vents has a diameter that is between 10 percent and 30 percent of a diameter of at least one opening in the plurality of openings, preferably between 15 percent and 25 percent of the diameter of the at least one opening.

In yet other preferred forms, at least one vent in the plurality of vents is spaced apart from at least one opening in the plurality of openings by a distance of between 0.5 radii and 2 radii of the at least one vent.

DETAILED DESCRIPTION

The trim assemblies described herein advantageously provide reduced noise signatures when compared to prior art trim assemblies. The disclosed trim assemblies may be used as stand-alone trim assemblies, or the disclosed trim assemblies may be combined with other trim assemblies to produce trim assemblies that characterize fluid flow while reducing noise. While the disclosed trim assemblies may be used in any type of valve, the disclosed trim assemblies may be particularly useful in sliding stem control valves.

Figure 1:
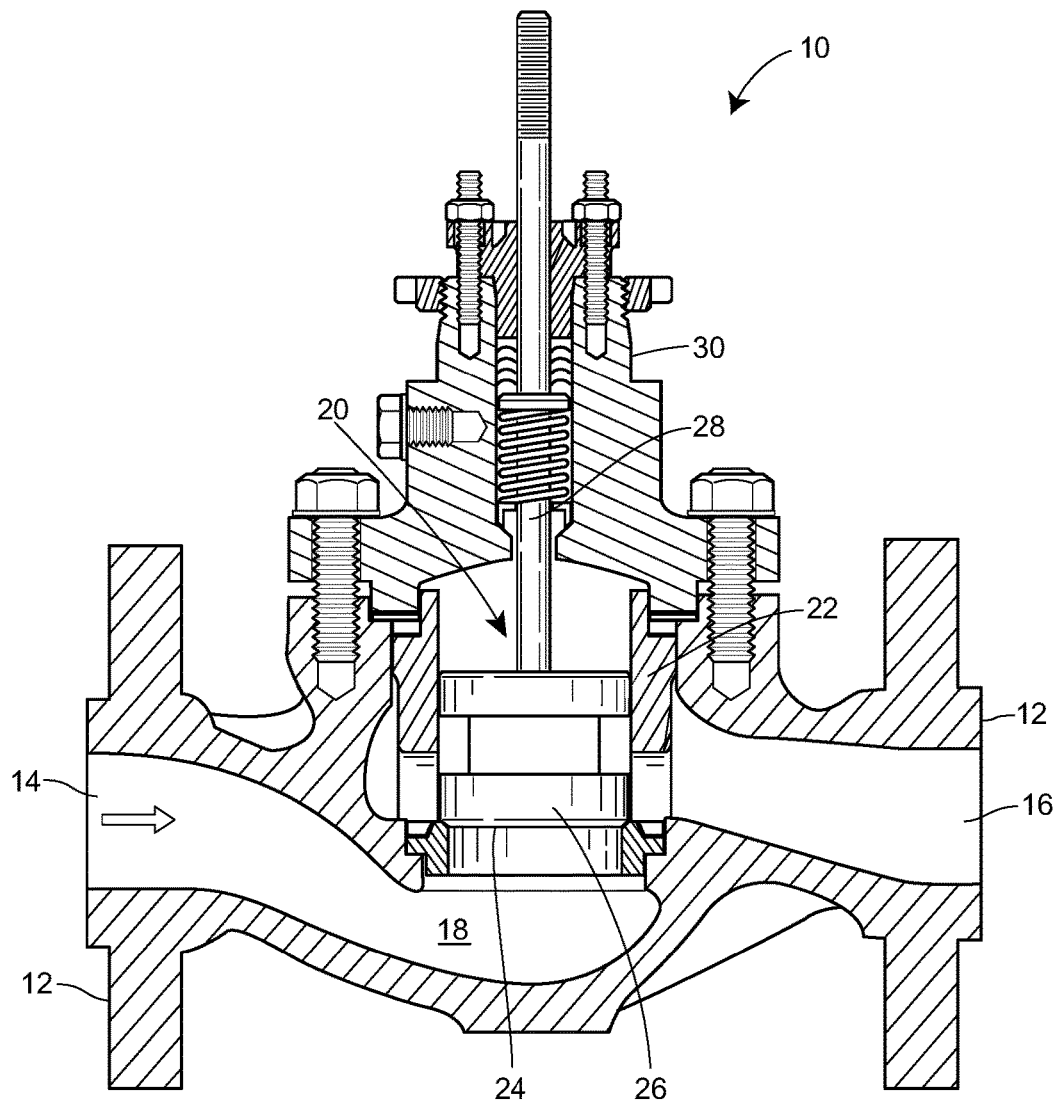
FIG. 1 is a cross-sectional view of a known control valve having a known trim assembly.
Figure 2:
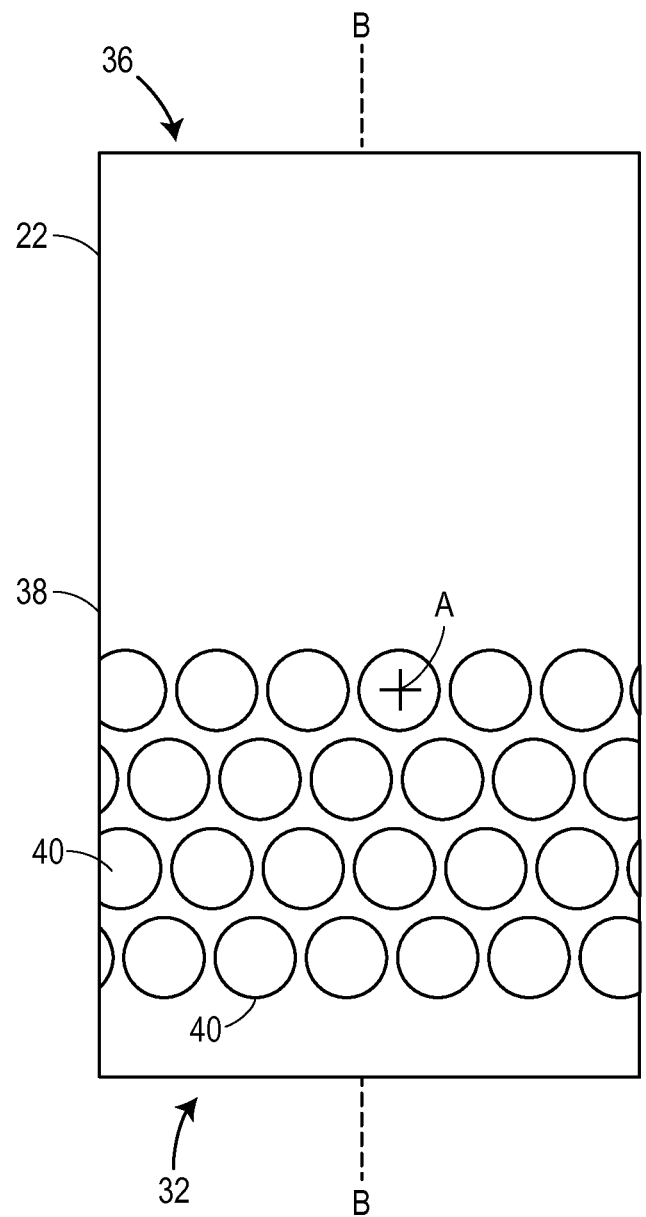
FIG. 2 is a close up view of a cage of the trim assembly of FIG. 1.
Figure 3:
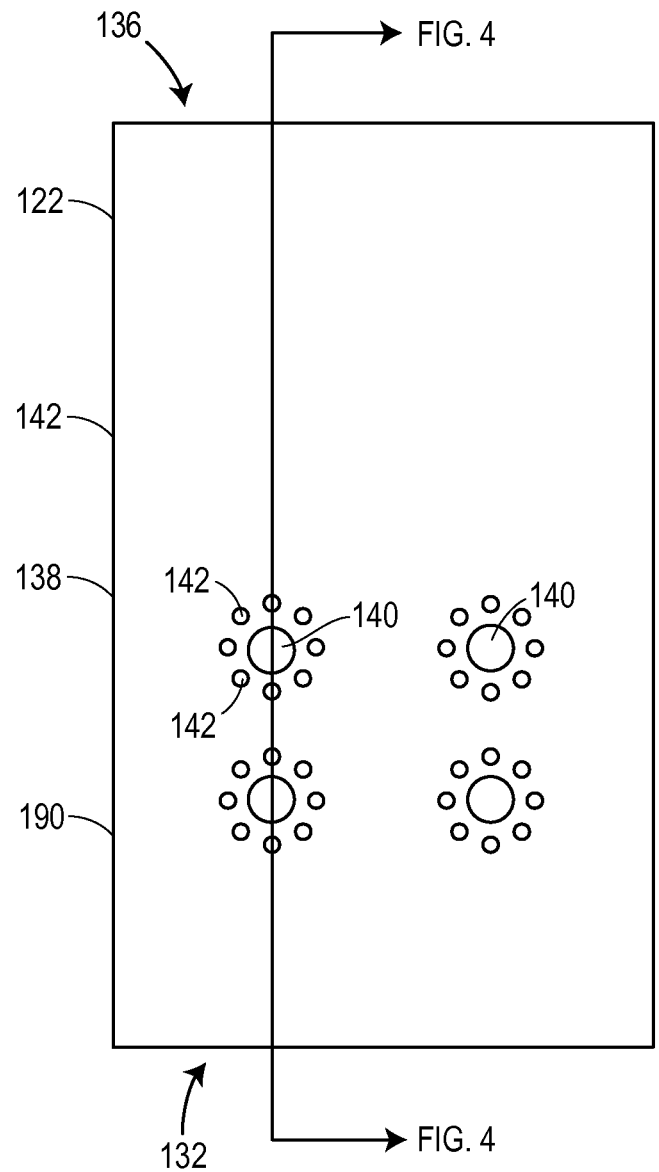
FIG. 3 is a close up view of one embodiment of a cage of a noise reducing trim assembly constructed in accordance with the teachings of the disclosure.

Turning now to FIG. 3, one embodiment of a cage 122 that is constructed in accordance with the teachings of the disclosure may include a first end 132 and a second end 136. The cage 122 may be used in a conventional control valve, such as the control valve 10 of FIG. 1. A cage wall 138 extends between the first end 132 and the second end 136, the cage wall 138 forming a hollow central bore within which the valve plug slides to control fluid flow through the cage 122. A first plurality of cage openings 140 is formed in the cage wall 38. The first plurality of cage openings 140 characterize fluid flowing through the cage 122, by for example, reducing the pressure of the fluid as it flows through the first plurality of openings 140. A second plurality of openings, which may take the form of vents 142, may surround each opening in the first plurality of openings 140. In one embodiment, each opening in the first plurality of openings 140 may be surrounded by eight equally spaced vents 142. In other embodiments, each opening in the first plurality of openings 140 may be surrounded by more or less than eight equally spaced vents 142. For example, each opening in the first plurality of openings 140 may be surrounded by two, three, four, five, six, seven, nine, ten, eleven, twelve or more vents 142.

Figure 4:
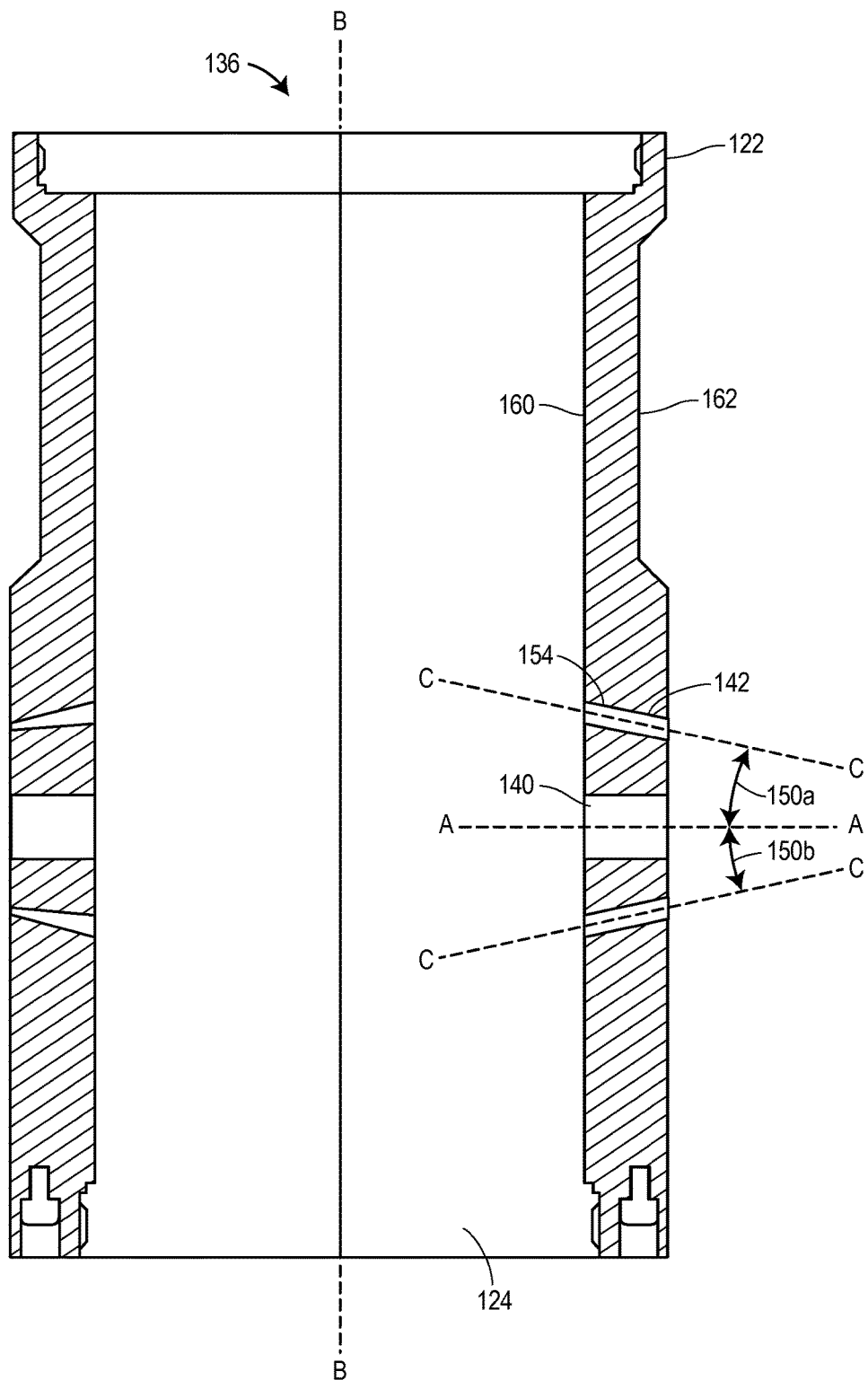
FIG. 4 is a cross-sectional view of the cage of FIG. 3.

FIG. 4 is a cross-sectional view of the cage 122 of FIG. 3. Each opening in the first plurality of openings 140 includes a central axis A that is substantially perpendicular to the longitudinal axis B of the cage 122 (i.e., the central axis A is angled between 85 degrees and 95 degrees relative to the longitudinal axis B). Each vent 142 is formed about a central axis C that is angled (i.e., non-perpendicular and non-parallel) relative to the longitudinal axis B of the cage 122. An angle 150a, 150b is formed between the central axis C of the vents 142 and the central axis A of the openings 140. In some embodiments, the angle 150a, 150b may range between 10 degrees and 80 degrees, preferably between 20 degrees and 70 degrees, and more preferably between 30 degrees and 60 degrees. Angles in these ranges provide superior noise reduction characteristics.

In the embodiment of FIG. 4, the vents 142 include openings having substantially parallel side walls 154 when viewed in cross-section, as viewed on the right side of FIG. 4, the second plurality of openings 142 taking the shape of circular cylinders or circular bores. In other embodiments, the vents 142 may have side walls 154 that taper inwardly from the inner surface 160 of the cage 122 towards the outer surface 162 of the cage 122, thereby forming a cone-shaped opening, nozzle, or funnel, as viewed on the right side of FIG. 4. Tapering the side walls 154 increases the velocity of the fluid flowing through the vents 142, which may increase the noise suppression capability of the cage 122. In some embodiments the side walls 154 may taper beginning at the inner surface 160 and continue tapering to the outer surface 162. In other embodiments, the side walls 154 may begin tapering at an intermediate point between the inner surface 160 and the outer surface 162. In some embodiments, the side walls 154 may taper towards one another at an angle in the range of 5 degrees to 20 degrees, preferably in the range of 10 degrees to 15 degrees. Tapering the side walls 154 in these ranges provides superior noise cancelling capabilities.

Returning now to FIG. 3, in some embodiments, the vents 142 may have diameters that are between 10 percent and 30 percent of the diameter of the openings in the first plurality of openings 140, preferably between 15 percent and 25 percent, and more preferably approximately 20 percent. In other embodiments, the vents 142 may be spaced apart from the first plurality of openings 140 by a distance of between 0.5 radii and 2 radii of the radius of the vents 142, preferably between 0.75 radii and 1.5 radii, and more preferably approximately 1 radius.

Without being bound by theory, it is believed that the fluid flowing out of the vents 142 compresses a shear region generated by the fluid flowing out of the first plurality of openings 140 due to the directional flow from the vents 142 towards the first plurality of openings 140. Furthermore, it is believed that the fluid flowing out of the vents 142 stabilizes the flow downstream of the first plurality of openings 140. Both of these effects reduce the noise generated by fluid flowing through the first plurality of openings.

Although certain trim assemblies and control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A fluid valve comprising:
  a valve body having a fluid inlet and a fluid outlet connected by a fluid passageway;
  a trim assembly disposed within the fluid passageway, the trim assembly having a cage and a seat;
  a fluid control member movably disposed within the fluid passageway, the fluid control member cooperating with the trim assembly to control fluid flow through the fluid passageway; and
  a plurality of openings disposed in a wall of the cage, the plurality of openings characterizing fluid flow through the trim assembly, and a plurality of vents disposed around each opening in the plurality of openings, the plurality of vents directing fluid flow towards fluid flowing out of the plurality of openings to suppress noise generated by the fluid flowing out of the plurality of openings,
  wherein at least one opening in the plurality of openings includes a central axis that is substantially perpendicular to a longitudinal axis of the cage, and at least one vent in the plurality of vents includes a central axis that is angled, non-parallel and non-perpendicular, to the longitudinal axis of the cage.

2. The fluid valve of claim 1, wherein the central axis of the at least one opening and the central axis of at least one vent are angled, non-parallel and non-perpendicular, relative to one another.

3. The fluid valve of claim 2, wherein the angle between the central axis of the at least one opening and the central axis of the at least one vent is between 10 degrees and 80 degrees.

4. The fluid valve of claim 3, wherein the angle is between 20 degrees and 70 degrees.

5. The fluid valve of claim 4, wherein the angle is between 30 degrees and 60 degrees.

6. The fluid valve of claim 1, wherein the plurality of vents includes between two and twelve vents around at least one opening in the plurality of openings.

7. The fluid valve of claim 6, wherein the plurality of vents includes between six and eight vents around at least one opening in the plurality of openings.

8. The fluid valve of claim 1, wherein at least one vent in the plurality of vents includes side walls that are parallel to one another.

9. The fluid valve of claim 1, wherein at least one vent in the plurality of vents is a circular bore.

10. The fluid valve of claim 1, wherein at least one vent in the plurality of vents includes side walls that angle inwardly relative to one another.

11. The fluid valve of claim 10, wherein the side walls angle from an inner surface of the cage to an outer surface of the cage.

12. The fluid valve of claim 10, wherein the at least one vent forms a nozzle.

13. The fluid valve of claim 1, wherein at least one vent in the plurality of vents has a diameter that is between 10 percent and 30 percent of a diameter of at least one opening in the plurality of openings.

14. The fluid valve of claim 13, wherein the diameter of the at least one vent is between 15 percent and 25 percent of the diameter of the at least one opening.

15. The fluid valve of claim 1, wherein at least one vent in the plurality of vents is spaced apart from at least one opening in the plurality of openings by a distance of between 0.5 radii and 2 radii of the at least one vent.

16. A cage for a trim assembly of a control valve, the cage comprising:
 a cage wall extending from a first end to a second end, the cage wall forming a hollow circular cylinder;
 a plurality of openings disposed in the cage wall, the plurality of openings characterizing fluid flow through the cage; and
 a plurality of vents disposed around at least one opening in the plurality of openings, the plurality of vents directing fluid flow towards fluid flowing out of the at least one opening to suppress noise generated by the fluid flowing out of the at least one opening,
 wherein the at least one opening includes a central axis that is substantially perpendicular to a longitudinal axis of the cage, and at least one vent in the plurality of vents includes a central axis that is angled, non-parallel and non-perpendicular, to the longitudinal axis of the cage, the central axis of the at least one opening being angled relative to the central axis of the at least one vent in the range of between 10 degrees and 80 degrees.

17. The cage of claim 16, wherein the at least one vent is spaced apart from the at least one opening in the range of between 0.5 radii and 2 radii of the at least one vent.

18. The cage of claim 16, wherein the at least one vent includes tapered side walls, which form a nozzle that accelerates fluid flowing through the at least one vent.

* * * * *